Aug. 7, 1956     C. W. CROWDER     2,757,938
HYDRAULIC MOTOR VEHICLE STABILIZER
Filed April 9, 1954     2 Sheets-Sheet 1

INVENTOR.
Charles W. Crowder
BY *Victor J. Evans & Co.*
ATTORNEYS

Aug. 7, 1956     C. W. CROWDER     2,757,938
HYDRAULIC MOTOR VEHICLE STABILIZER
Filed April 9, 1954.     2 Sheets-Sheet 2
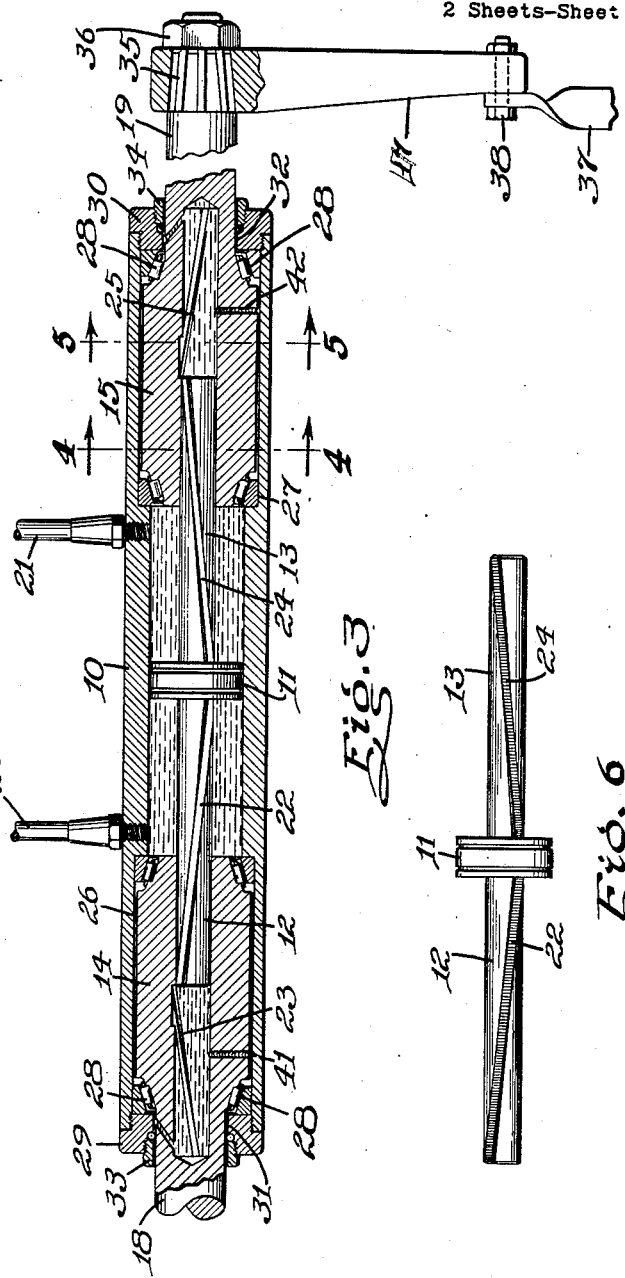
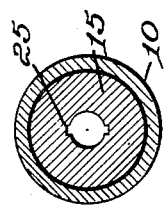
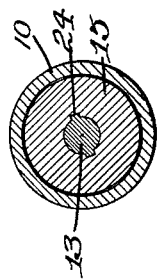
INVENTOR.
Charles W. Crowder
BY Victor J. Evans & Co.
ATTORNEYS United States Patent Office 2,757,938
Patented Aug. 7, 1956

2,757,938
HYDRAULIC MOTOR VEHICLE STABILIZER

Charles W. Crowder, Manchester, Ga.

Application April 9, 1954, Serial No. 422,035

2 Claims. (Cl. 280—112)

This invention relates to safety devices adapted to be applied to motor vehicles to prevent vehicles turning over in traveling around corners at high speed, and in particular a stabilizing device connected to the steering instrumentalities of a motor vehicle wherein, upon operation of a steering wheel of the vehicle the body of the vehicle is drawn downwardly on one side and elevated on the opposite side.

The purpose of this invention is to provide means for automatically banking the body of a motor vehicle passing around a curve to provide greater comfort in riding and also to substantially prevent motor vehicles turning over.

In making a turn at comparatively high speed the momentum of the vehicle has a tendency to throw the upper part of the body of the vehicle away from the direction of the turn whereby the springs on the inside or on the shorter radius of the turn are extended and the springs on the outside or long radius of the turn are compressed. With this movement the center of gravity moves toward the outside and it is relatively easy for the resulting force or momentum to pull the vehicle over. With this thought in mind this invention contemplates automatically operating mechanical means for extending the springs on the outside and compressing the springs on the inside of the body of a motor vehicle as the vehicle navigates a turn whereby the center of gravity is moved toward the inside and the possibility of the vehicle turning over is obviated.

The object of this invention is, therefore, to provide means in steering instrumentalities of motor vehicles whereby upon making a turn, such as to the left, the springs on the left hand side of the forward end of the vehicle are compressed and the springs on the opposite or right hand side of the vehicle are extended.

Another object of the invention is to provide stabilizing means for motor vehicles that enables the vehicles to travel around curves at relatively high speeds and that is adapted to be installed on vehicles now in use, without materially changing parts thereof.

A further object of the invention is to provide automatically operating stabilizing means for motor vehicles to facilitate vehicles passing around curves in which the stabilizing device is of a simple and economical construction.

With these and other objects and advantages in view the invention embodies an elongated cylinder adapted to be installed in combination with the front axle of a motor vehicle with arms at the ends connected to conventional arms of the front axle to which stabilizers are connected and with hydraulic means in the cylinder for raising and lowering the arms as the vehicle turns from one side to the other.

Other features and advantages of the invention will appear from the following description taken in connection with the drawings, wherein:

Figure 3 is a longitudinal section through the hydraulic cylinder that operates the arms of this invention with one of the arms shown at one end and with parts broken away.

Figure 4 is a cross section through the hydraulic cylinder taken on line 4—4 of Fig. 3.

Figure 5 is a similar cross section taken on line 5—5 of Fig. 3.

Figure 6 is a detail showing a piston positioned in the intermediate part of the cylinder with rods having spirally disposed ribs thereon extended from the sides of the piston.

Figure 1:
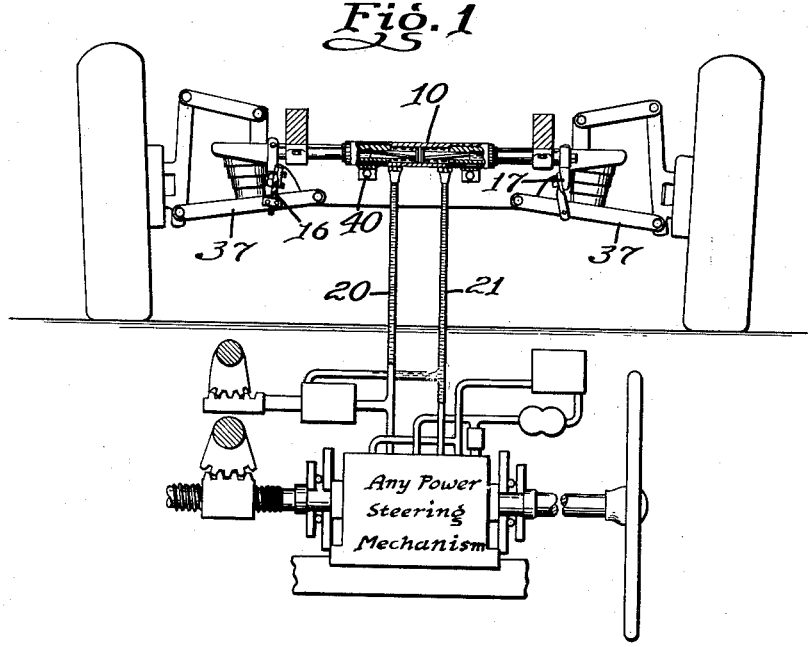
Figure 1 is a front elevational view illustrating a typical front axle of a motor vehicle with a power steering mechanism connected to the cylinder of this invention and shown in a position below the vehicle for the purpose of illustration.

The hydraulic motor vehicle stabilizer as disclosed in the above-referred-to drawings is disclosed and described as installed in combination with the front wheels of a vehicle and it will be understood that the apparatus is also adapted to be used in combination with the rear wheels.

Referring now to the drawings wherein like reference characters denote corresponding parts the improved motor vehicle stabilizer of this invention includes an elongated cylinder 10 having a piston 11 with splined rods 12 and 13 extended from the ends thereof, bearings 14 and 15 rotatably mounted in the cylinder and positioned to be actuated by the rods 12 and 13 of the piston, arms 16 and 17 mounted on the ends of spindles 18 and 19, respectively extended from the bearings, and spaced hydraulic connections 20 and 21 extended from opposite ends of the cylinder to opposite sides of a power steering mechanism or to means for applying fluid under pressure to the ends of the cylinder, respectively.

As illustrated in Fig. 3 the rod 12 extended from one side of the piston 11 is provided with a spline or rib 22 that coacts with a groove 23 in the bearing 14 whereby upon movement of the piston longitudinally of the cylinder in one direction the bearing 14 rotates in a clockwise direction and upon movement of the piston in the opposite direction the bearing 14 rotates in a counterclockwise direction.

The rod 13 is also provided with a spline or rib 24 that is positioned to coact with a spiral groove 25 in the bearing 15 whereby the bearing 15 rotates in clockwise and counterclockwise directions with movements of the piston 11.

The bearings 14 and 15 are rotatably mounted in cylindrical sections 26 and 27, respectively of the cylinder 10 with bearings, as indicated by the numeral 28 and the ends of the cylinder are closed with bushings 29 and 30 which are provided with openings 31 and 32, respectively for the spindles 18 and 19. The bushings are also provided with packing glands, as indicated by the numerals 33 and 34.

The spindles 18 and 19 are provided with splined ends 35 on which the arms 16 and 17 are secured with nuts 36 and, as shown in Fig. 3, the ends of the arms are secured to spring supports 37 with bolts 38.

With the cylinder 10 mounted on the front crossbar of a motor vehicle, such as with bolts 39 extended through lugs 40 and with the arms 16 and 17 connected to the spring supports 37 the turning movement of the steering wheel of a vehicle on which the device is installed in one direction causes fluid to be supplied to an end of the cylinder through the connection 20 and with the wheel turned in the opposite direction fluid under pressure is supplied to the cylinder through the connection 21. With the fluid supplied to the connection 20 the fluid on the opposite side of the piston is returned through the connection 21.

The bearing 14 is provided with an oil vent 41 and a similar vent 42 is provided in the bearing 15.

It will be understood that the connections 20 and 21 may extend to suitable means for supplying fluid, such as oil, under pressure and oil is supplied to one connection as the steering wheel is turned in one direction and to the opposite direction as the steering wheel is turned in the other direction.

The power steering mechanism illustrated in Fig. 1 is only typical and it will be understood that any suitable power steering mechanism may be used and it will also be understood that the power steering mechanism may be omitted and the oil under pressure supplied by other means.

Figure 2:
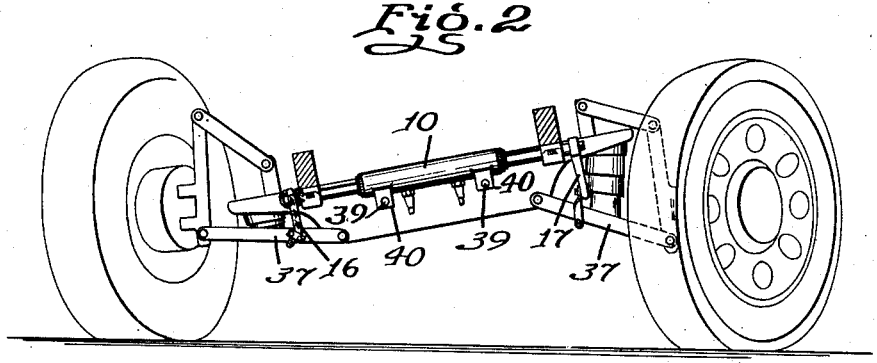
Figure 2 is a view similar to that shown in Fig. 1 with the power steering mechanism omitted and with the spring at one end of the front axle compressed and the spring at the opposite end extended.

With the parts designed and assembled as shown and described it will be understood that with a vehicle upon which the device is installed, turning to the left fluid under pressure is supplied to the connection 21 whereby the piston 11 is moved toward the left and the arm 16 is actuated to compress the springs on the left hand side of the vehicle. In the same movement the arm 17 on the opposite side of the vehicle moves upwardly expanding the springs on the right hand side of the vehicle whereby the body of the vehicle is banked, as illustrated in Fig. 2 so that it may travel around a corner at comparatively high speed without turning over. Also with the vehicle banked, as illustrated in Fig. 2, more comfortable riding is provided.

It will be understood that other modifications, within the scope of the appended claims, may be made in the design and arrangement of the parts without departing from the spirit of the invention.

What is claimed is:

1. A motor vehicle stabilizer comprising a hydraulic cylinder adapted to be mounted on the front crossbar of a motor vehicle, a piston having rods with spirally disposed ribs thereon extended from ends thereof and mounted in the cylinder, hydraulic connections to the cylinder positioned on opposite sides of the piston, bearings rotatably mounted in the cylinder and having grooves therein positioned to coact with the ribs of the rods of the pistons, and arms carried by said bearings and adapted to be connected to wheel mounting elements on the ends of a front axle upon which the device is mounted, said piston and bearing assemblies being positioned whereby upon the application of fluid under pressure to one end of the cylinder an arm at one end of the cylinder is moved downwardly and an arm at the opposite end of the cylinder is moved upwardly.

2. In a stabilizing device for motor vehicles, an elongated hydraulic cylinder for use on the front crossbar of a vehicle, bearings having openings therein and also having spindles extended therefrom rotatably mounted in the ends of the cylinder, said openings in the bearings having spirally disposed grooves therein, a piston in the cylinder, rods extended from opposite sides of the piston and having spirally disposed ribs thereon, said spirally disposed ribs of the rods being adapted to coact with the spirally disposed grooves of the bearings, and arms mounted on the extended ends of the spindles, said cylinder having supply connections for fluid under pressure positioned on opposite sides of the piston and said supply connections being adapted to supply fluid under pressure to one end of the cylinder as a steering wheel of the vehicle is turned in one direction and to the opposite end of the cylinder as the steering wheel is turned in the opposite direction.

References Cited in the file of this patent

UNITED STATES PATENTS

| 2,192,175 | Ballard | Mar. 5, 1940 |
| 2,387,249 | Eddington | Oct. 23, 1945 |

FOREIGN PATENTS

| 735,435 | France | Nov. 8, 1932 |